United States Patent [19]

Heim et al.

[11] Patent Number: 4,791,856
[45] Date of Patent: Dec. 20, 1988

[54] SINGLE ACTING HYDRAULIC ACTUATOR WITH VARIABLE RETURN FORCE

[75] Inventors: Edgar Heim, Långesund; Kurt Sande, Fredrikstad; Staaland, Tørbjrn, Nedenes, all of Norway

[73] Assignee: Skarpenord Control Systems A/S, Rjukan, Norway

[21] Appl. No.: 64,607

[22] Filed: Jun. 22, 1987

[51] Int. Cl.⁴ .................................................. F16J 1/10
[52] U.S. Cl. ........................................ 92/84; 92/14; 92/25; 92/65; 251/63.6
[58] Field of Search ............. 92/65, 76, 84, 25, 130 A, 92/23, 130 B, 29, 14; 138/31; 166/322; 251/1, 2, 3, 63.6, 62

[56] References Cited

U.S. PATENT DOCUMENTS

| | | | |
|---|---|---|---|
| 2,809,596 | 10/1957 | Sullwold | 138/31 |
| 2,809,667 | 10/1957 | Knapp | 138/31 |
| 2,989,000 | 6/1961 | Alcaro | 92/76 |
| 3,812,766 | 5/1974 | Weiss | 92/14 |
| 4,523,516 | 6/1985 | Foster et al. | 251/63.6 |
| 4,527,631 | 7/1985 | Vazquez | 166/322 |
| 4,552,056 | 11/1985 | McKay | 92/130 A |

Primary Examiner—Robert E. Garrett
Assistant Examiner—Thomas Denion
Attorney, Agent, or Firm—Wenderoth, Lind & Ponack

[57] ABSTRACT

A spring operated valve actuator with variable return force includes a compact spring mechanism with a short but very powerful closing characteristic. The energy provided by the spring mechanism is applied during the entire movement of the valve, with varying forces localized according to particular needs. The spring mechanism and a movable piston member are mechanically and drivingly interconnected by a variable reduction mechanism.

3 Claims, 3 Drawing Sheets

SINGLE ACTING HYDRAULIC ACTUATOR WITH VARIABLE RETURN FORCE

BACKGROUND OF THE INVENTION

This invention relates to a single acting hydraulic actuator with variable return force, which is suited for automatic control of safety valves and for rapid closure of such valves in emergency situations.

Such single acting hydraulic actuators are normally used on gate valves and are mounted directly to a valve stem which is movable for opening as well as for closing of the valve. An example of practical utilization in the oil industry is on the so-called Christmas Trees, as emergency blow out preventer valves for the main production stream of hydrocarbons, where the valves will be closed safely and efficiently when an abnormal situation arises. Such valve actuators are known for use both in sub sea and in top side equipment, for example on the deck of an offshore oil production platform. Such actuators will normally be mounted directly on the bonnet or housing of the valve, and the piston rod of the actuator will be connected to the valve spindle for control and regulation of the valve. As long as the control circuit is pressurized the valve rod or spindle is moved to and kept in the open position and a spring in the actuator is tensioned or loaded. When pressure is removed the pressure or force of the spring will be released and act via the piston rod directly on the valve spindle and move this against the frictional resistance of the valve to a position where the valve is completely closed.

The prior known valve actuators of this type, for example as discussed in U.S. Pat. No. 4,527,631 and the brochure "Model "OOH" Linear Hydraulic Gate Valve Actuator"—AVA-International—of Feb. 7, 1984, have direct connection between the valve spindle and the spring mechanism. This means that when the spring is extended 10 mm, the valve spindle will have moved a corresponding distance. This is impractical and inconvenient due to the fact that the demand for available closing power usually is highest when the spring is depressurized and near the end of its extension.

Furthermore, it is a requirement that the valve, in addition to securing efficient closure, also have the capacity to cut through any possible hindrances, such as tubes, wires and the like, that might be blocking the free closure of the gate valve within the bore or in tee tube string. This has resulted in the actuator equipment being voluminous and requires a great deal of space. Correspondingly, the dimensions of the spring are very great, the spring mechanism itself having an extended length of 1.5 m or more.

SUMMARY OF THE INVENTION

It is an object of the present invention to provide a spring controlled valve actuator with variable return force not having the above drawbacks and whereby, by utilization of a compact and space-saving spring mechanism, there can be established closing forces that are precisely adapted to the closing characteristics of the valve mechanism, and whereby near the end of the spring movement high closing forces are available to cut through possible obstructing objects tending to prevent closing of the valve.

According to the invention, this object is achieved by the utilization of a sturdy spring mechanism having short but very powerful closing characteristics, where the energy from the spring mechanism is distributed or shifted over the complete closing movement of the valve, and where the energy or the power output can be varied and adapted to particular needs in different areas using the strongest forces, for example where it may be necessary to cut through obstructing objects and for the closing of the valve in its outermost position.

BRIEF DESCRIPTION OF THE DRAWINGS

Below, the invention will be described in more detail with reference to the accompanying drawings, wherein.

DETAILED DESCRIPTION OF THE INVENTION

Figure 1:
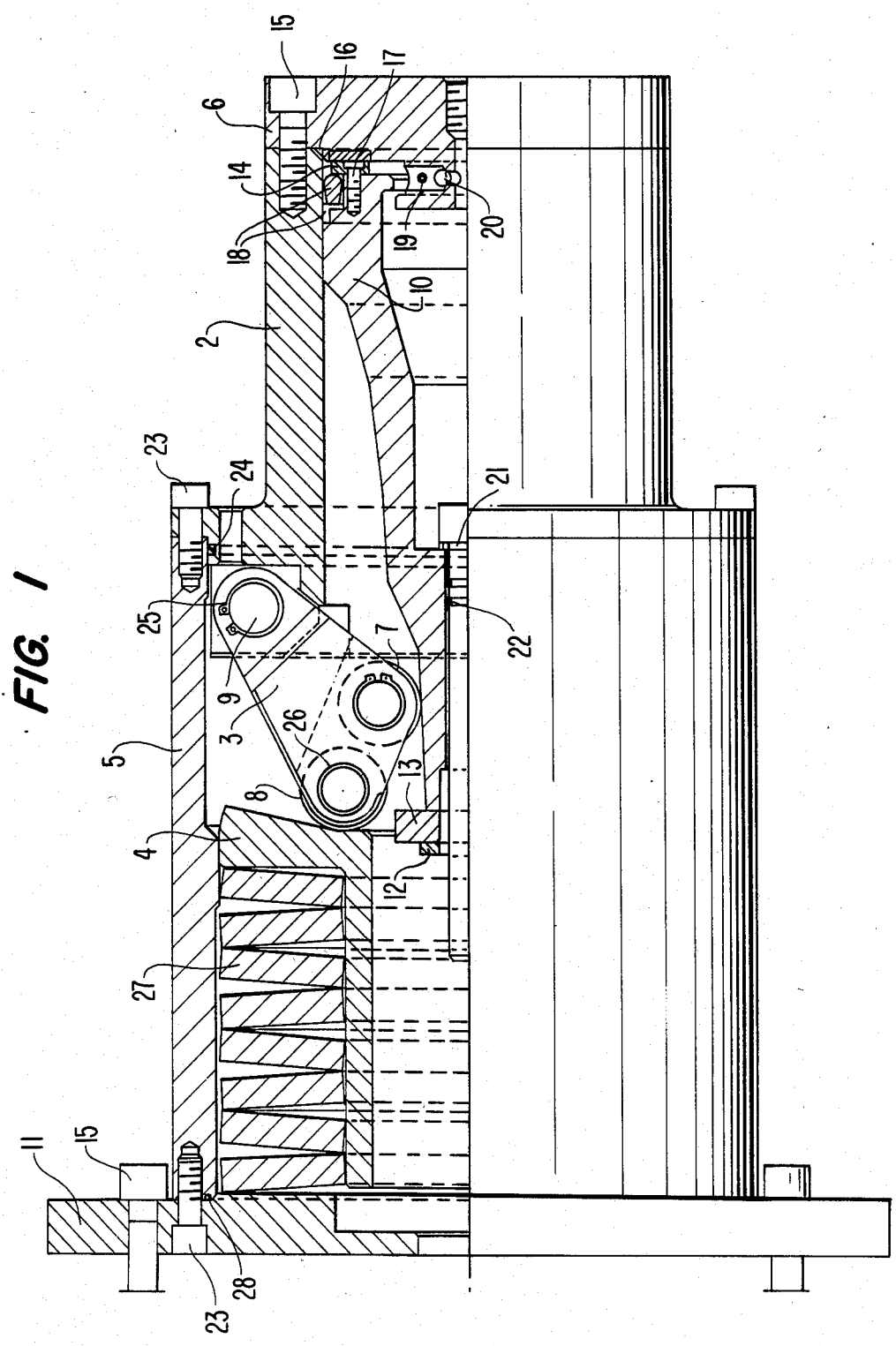
FIG. 1 is an elevation view, partly in longitudinal section, of an actuator unit with a spring unit or mechanism in a released and deactivated state.

As is apparent from the upper sectional half of FIG. 1, an actuator unit includes a cylinder 2 wherein is slidably mounted a piston member 10 including a piston and a rod integral therewith. Via lifting rods 3 and a spring guide member 4 the piston member 10 is connected to and in engagement with a spring mechanism consisting of a number of plate springs 27. In FIG. 1 the spring mechanism is shown in a detensioned position, and this results in the piston member 10 being positioned in an outermost position, i.e. to the far right in FIG. 1. The spring mechanism and the spring guide member 4 are mounted in a housing 5 which is attached to the cylinder 2 by means of bolts 23. An O-ring 24 seals the connection between housing 5 and cylinder 2. A lid or cover 6 is attached by means of bolts 15 to the outer end section of the cylinder 2. Pressurized fluid is introduced into the cylinder 2 to act on the piston member 10 via an inlet opening in the middle part of the lid 6. An O-ring 16 provides a sealed airtight connection between the lid and the cylinder 2. A pressure sleeve 19 and ball 20 terminate the inlet flange of the lid. A packing system 18 of the piston is kept in position by means of a piston ring 14 that is connected to the piston with screw members 17.

To obtain permanent and safe support of the piston member in its circumferential direction, there are provided three levers 3, one of which is shown in FIG. 1. The levers are rotatable mounted in studs or ears on the housing 5 by means of shafts 9 which are kept in position by means of segerrings 25. The opposite or free end of each lever is provided with a spring guide roller 8 which rotates in glider bearings 26 and engages against a inner end surface of the spring guide member 4. Additionally, at the lower or inner edge of each lever 3 is provided a piston rod roller 7 that is fastened and supported correspondingly to the roller 8 and that is supported against inclined surfaces machined on the rod of the piston member.

Figure 2:
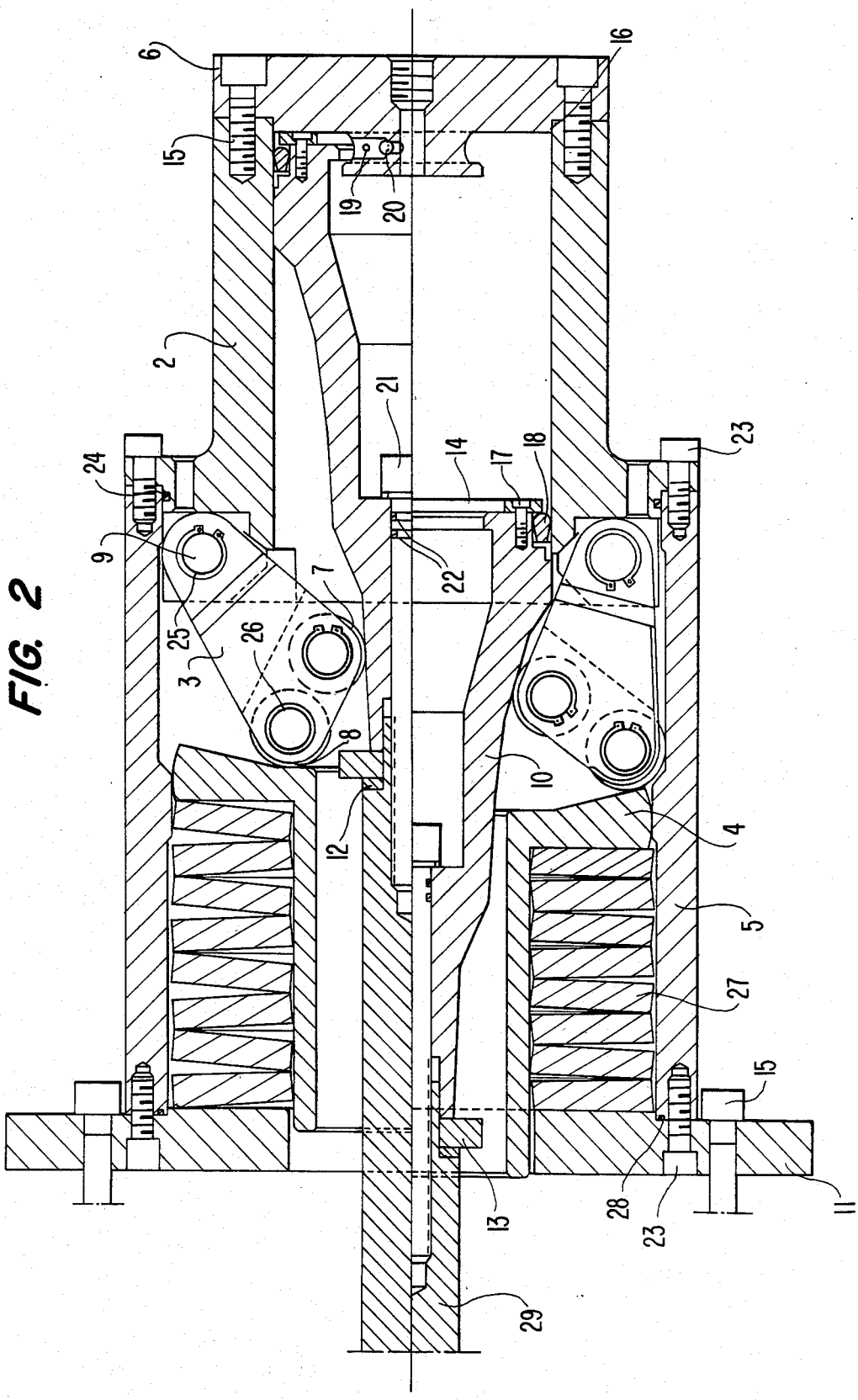
FIG. 2 is a similar, fully longitudinal, sectional view through the complete actuator unit, but where the upper half illustrates the spring unit in the deactivated state and where the lower half illustrates the spring unit in a tensioned or "loaded" state, and additionally illustrating how a short movement of the spring unit is transformed via a specific reduction or exchange mechanism according to the invention to a valve spindle that performs an extended movement under variable power output.

The actuator housing 5 is terminated or closed by a flange 11 which is connected to the housing by means of bolts 23, and a packing cord 28 provides sealing engagement between the housing and the flange. Furthermore, the flange is provided with bolts 15 or the like, for connecting it to the bonnet or housing of a valve (not shown). The piston member 10 is directly connected to a valve spindle 29 and moves the same forwards and backwards. The spindle is not shown in FIG. 1, but is outlined in FIG. 2 in its two end positions. The valve spindle 29 is firmly connected to the piston and the piston rod by means of a bolt 21. Two O-rings 22 provide sealing between the spindle and the piston. Further, there are provided an adjustment ring 12 and a ring-shaped stopper 13 at the outer end part of the piston member. These are used for relative axial adjustment between the valve spindle and the piston member.

The operation of the actuator unit now will be described. The inner end of the spring guide member 4 is supported against the spring guide rollers 8 of the levers 3. Additionally, the piston rod rollers 7 engage against inclined surfaces of the piston rod. When hydraulic pressure is activated, the piston member is forced from the outer position shown at the top of FIG. 2 to the inner position shown at the bottom in FIG. 2, and the resulting working force is utilized to move the valve spindle to an open position simultaneously as the spring mechanism is compressed such that the plate springs 27 are loaded or activated.

Figure 3:
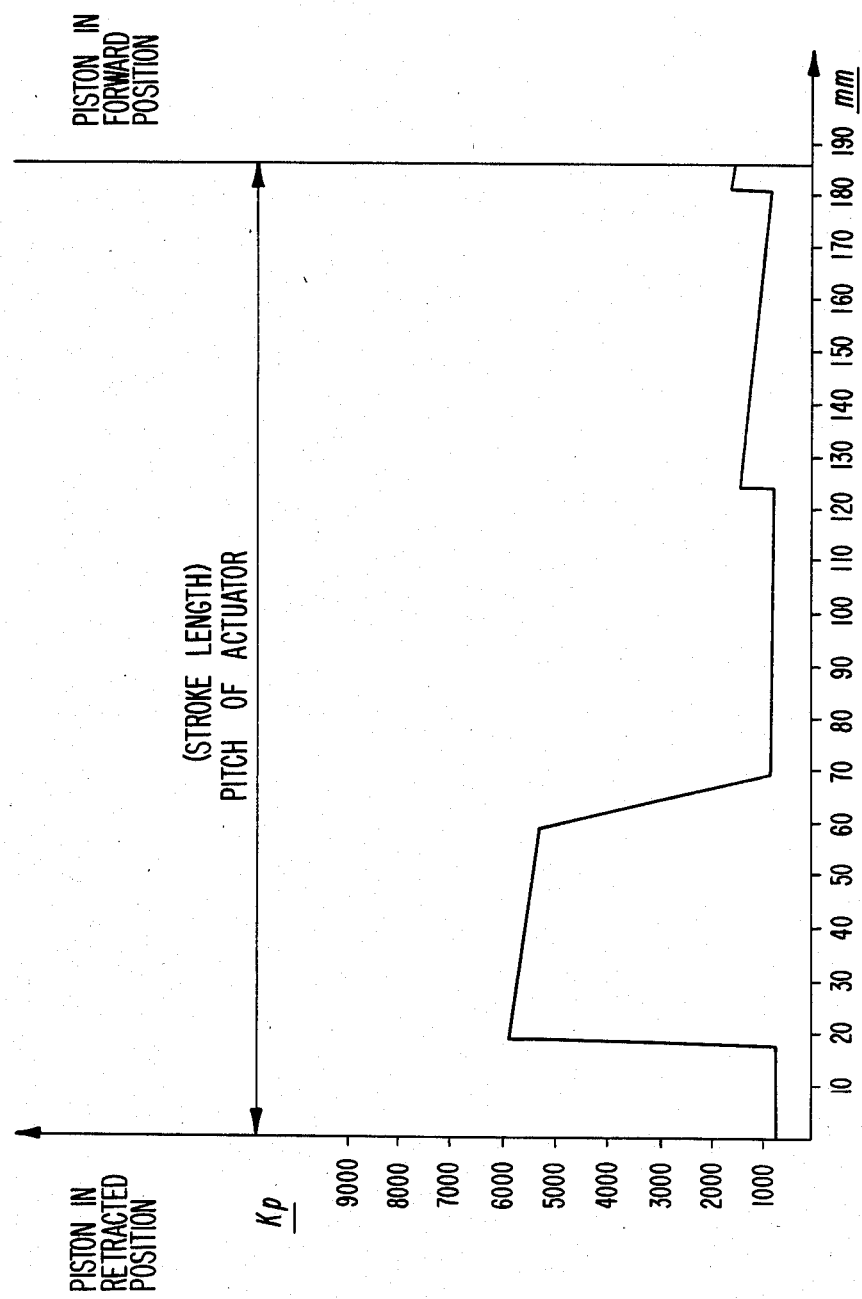
FIG. 3 is a diagram illustrating power outputs through the tensioning or loading and detensioning or releasing of the spring mechanism.

As seen from FIG. 3, the piston rod with valve spindle connected thereto move over a distance of approximately 180 mm. This movement is obtained by means of a spring mechanism having a total extension of 20 mm, i.e. a reduction ratio of about 9:1. The spring mechanism has a total length of 0.2–0.3 m, this being a substantially shorter length than the lengths necessary in prior known arrangements. The angle of inclination of the surfaces of the piston rod and the contour or outline of the inner end face of the guide member 4 determine the reduction ratio. The spring mechanism can therefore be made very short, but still have a high driving power during its short length of movement. The stored energy can hereby be utilized efficiently while the physical dimensions at the same time will be small. The inner end face of the guide member 4 extends at an angle of up to 20° in relation to a radial plane, and the outer contour or outline of the piston rod is so adjusted in relation to this inclination that a reduction or exchange ratio of 5:1 to 10:1 is obtained.

The power output during tensioning and release of the spring mechanism is illustrated by the diagram shown in FIG. 3. When the hydraulic pressure is applied, the piston member will star its movement from its 0-position with the spring mechanism in the released state, as seen in the upper sectional half according to FIG. 2. After a movement of approximately 20 mm during which a spring pressure of approximately 1000 kp has to be overcome, the slope or angle of inclination is increased to 20° and the spring pressure which has to be overcome is increased to approximately 6000 kp over a distance of approximately 35 mm. Thereafter the angle of inclination will decrease and the pressure in the spring will decrease to approximately 1000 kp. After a movement of approximately 125 mm the angle of inclination will increase again corresponding to a spring force of approximately 1500 kp. Finally, near the end of the movement the inclination angle will increase again, corresponding to a spring pressure of approximately 2000 kp. The pressure a this open state is to be kept continuously and this corresponds to stable operating conditions with the gate valve (not shown) kept in the open position.

If the pressure for one reason or another fails, a safety procedure is activated. The spring mechanism is released and moves the spindle controlling the closure of the gate valve in a sequence opposite to that described above. At the beginning a relatively high spring power is released to overcome any frictional forces and to start the movement of the mechanism. Thereafter the valve spindle is moved slowly and without the release of the very high spring forces. Near the end of this movement the closing power is strongly increased to secure the cutting through of possible unwanted obstructions and the remaining spring energy is then employed for the complete closing of the valve. However, this is only an example of the utilization of the special spring power mechanism according to the invention.

It is, however, possible to alter the power output by changing the angles of the inclined faces. Hereby it is possible to adjust the power output in correspondence to different valves and valve-closing characteristics without changing the outer physical dimensions of the mechanism.

The mechanism is compact and provides a very flexible utilization of the energy in the spring, which provides a near to ideal utilization of the sturdy plate springs moving very short distances during release of energy. The thickness of the adjustment ring 12 can be varied and this will provide a flexible and simple adjustment means to regulate the movable part of the valve by an axial movement of the spindle 29 connected to the piston rod via the bolt 21.

We claim:

1. A single acting hydraulic actuator with variable return force for controlling the movement of a valve spindle of a valve, said actuator comprising:
    a cylinder having therein a piston member including a piston and a piston rod to be connected to the valve spindle;
    means for supplying pressurized hydraulic fluid into said cylinder to act on said piston member to move said piston member within said cylinder from a released position to an activated position;
    a housing connected to said cylinder and containing a spring mechanism including a spring and a spring guide member abutting said spring; and
    variable reduction means for, upon movement of said piston member within said cylinder from said released position to said activated, causing compression movement of said spring by a distance less than the distance of said movement of said piston member, and for, upon stopping the supply of said pressurized fluid, causing released energy of said spring to return said piston member from said activated position to said released position, said reduction means comprising an outer surface of said piston rod having faces inclined at various angles of inclination to the direction of movement of said piston member, a plurality of single arm levers positioned at locations equally spaced about the outer circumference of said piston member, each said lever being rotatably mounted at a first end thereof within said housing, each said lever having at a second end thereof a spring guide roller abutting an inner end face of said spring guide member, and each said lever having adjacent said spring guide roller thereof a piston rod roller abutting said outer surface of said piston rod, whereby upon said movement of said piston member said faces of various angles of inclination contact said piston rod rollers to pivot said levers about said first ends thereof and move said spring guide rollers over said inner end face of said spring guide member.

2. An actuator as claimed in claim 1, wherein said inner end face of said spring guide member is inclined at an angle of up to 18° to a plane extending transverse to the direction of movement of said piston member, and said angles of inclination of said faces of said outer surface of said piston rod provide a radio of said distance of compression movement of said spring to said distance of movement of said piston-member of from 1:5 to 1:10.

3. An actuator as claimed in claim 1, wherein said spring comprises a plurality of spring plates.

* * * * *